Feb. 4, 1964     R. F. LEONARD     3,120,303
MODULAR CONVEYOR
Filed Feb. 23, 1961     3 Sheets-Sheet 1
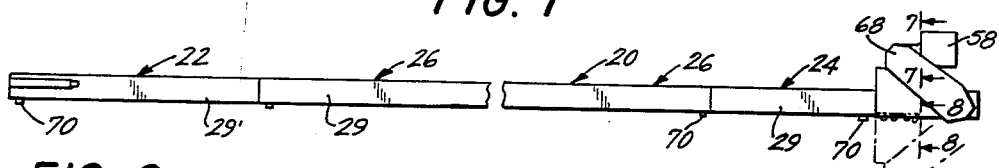
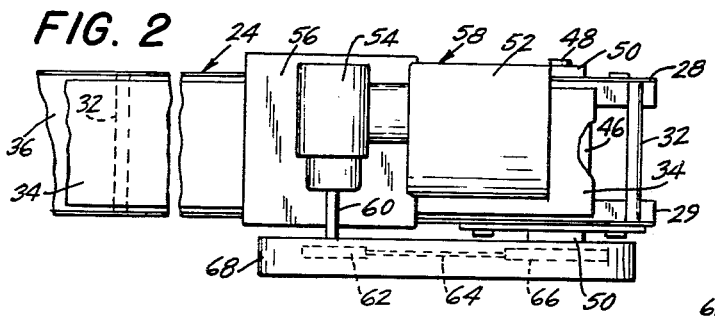
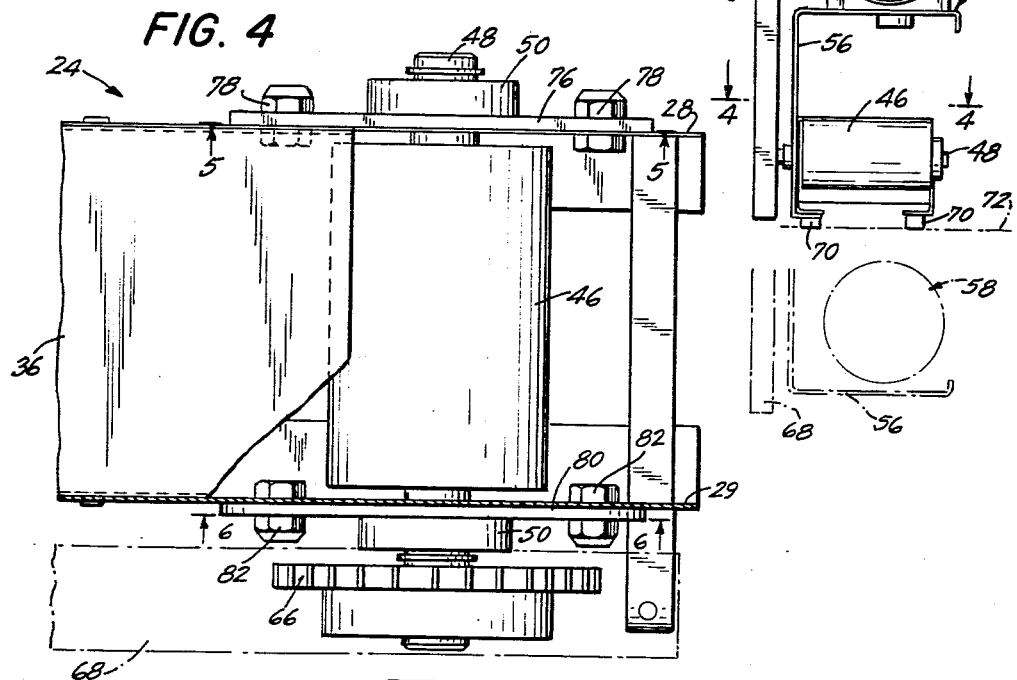
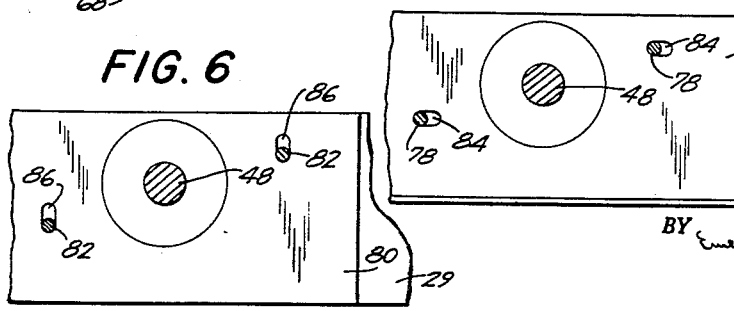
INVENTOR.
Roy F. Leonard
BY Emery, Whittemore,
Sandoe & Graham
ATTORNEYS

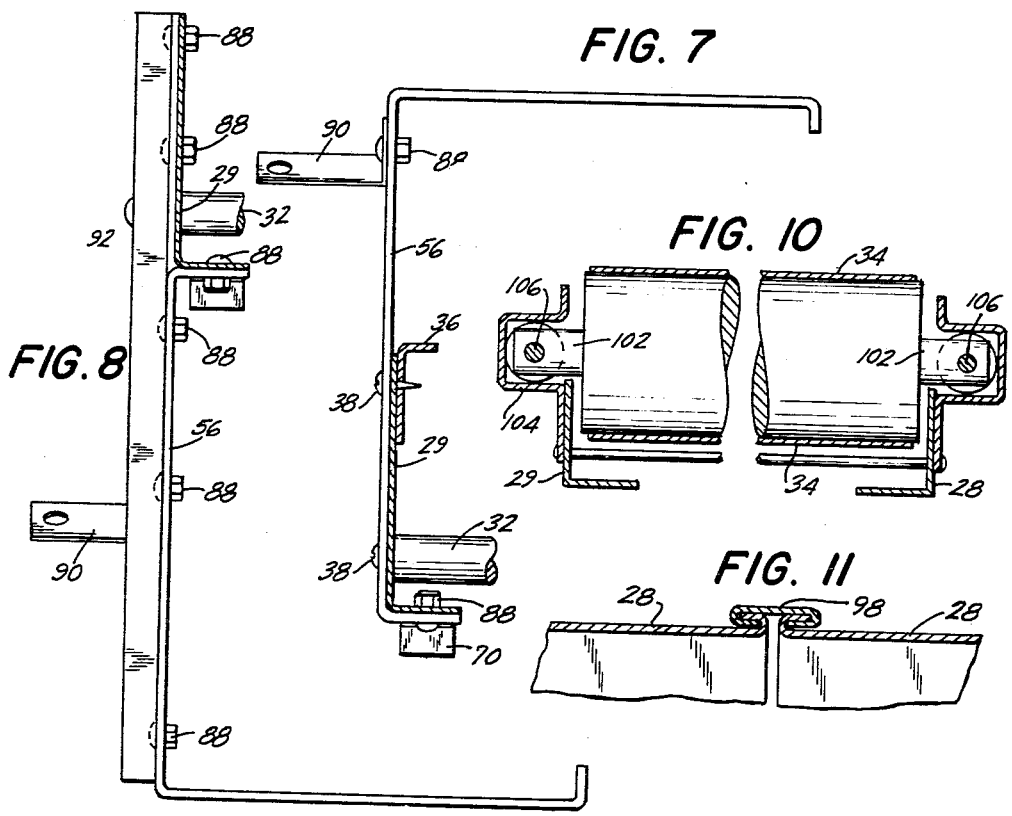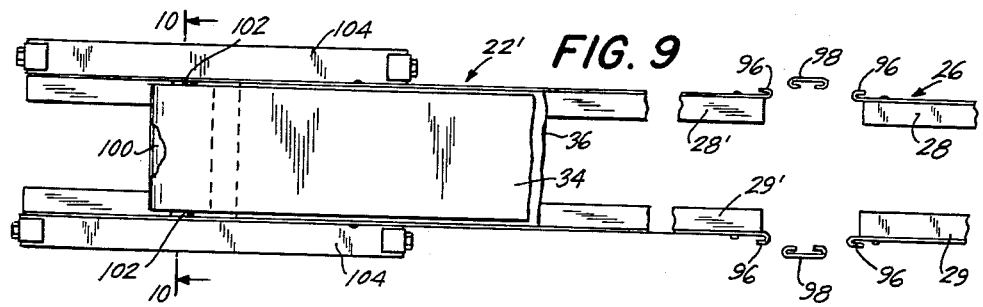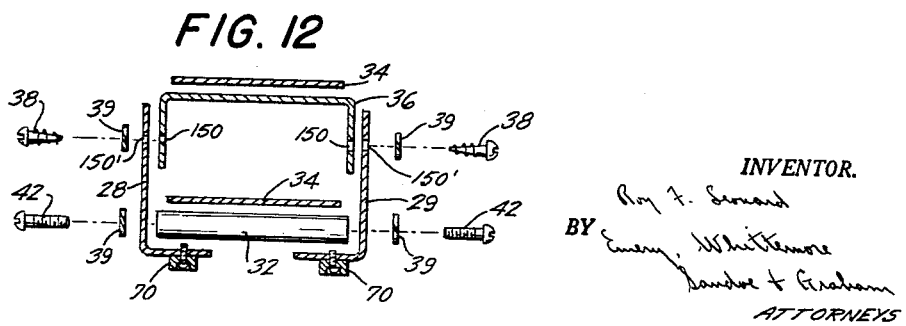

Feb. 4, 1964 R. F. LEONARD 3,120,303
MODULAR CONVEYOR
Filed Feb. 23, 1961 3 Sheets-Sheet 3
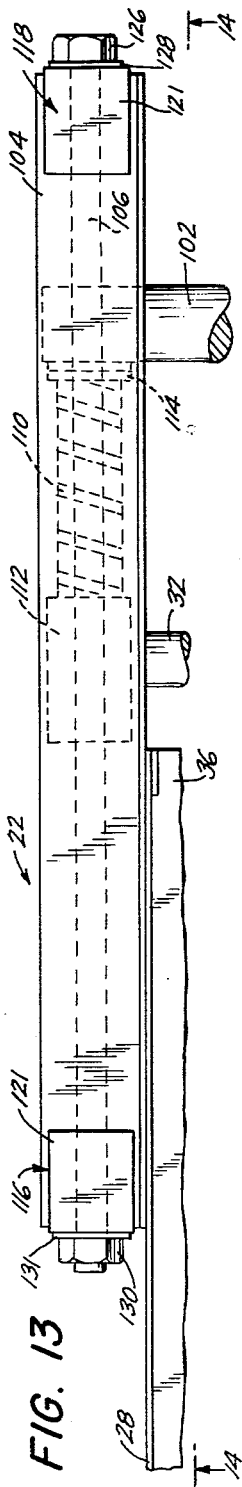
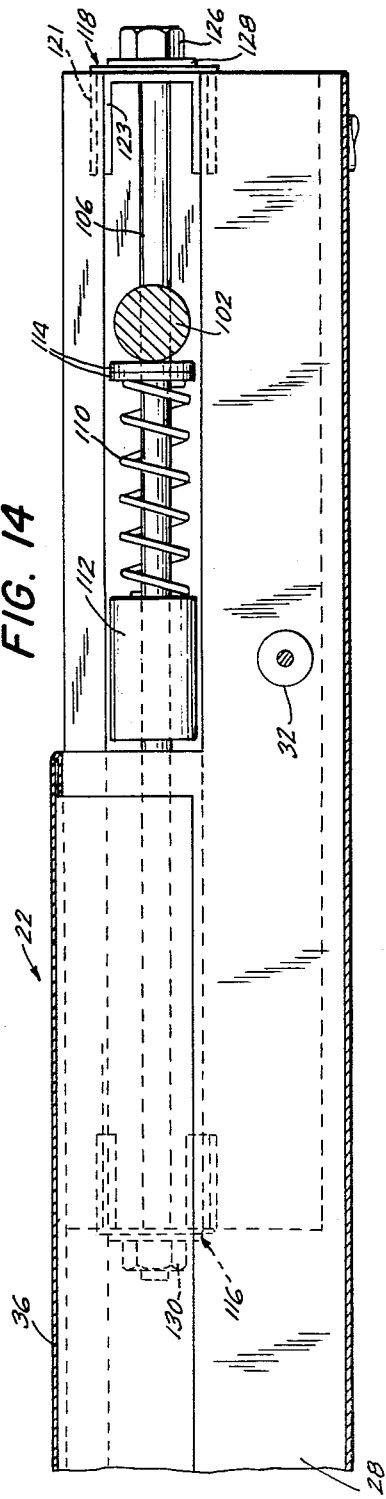
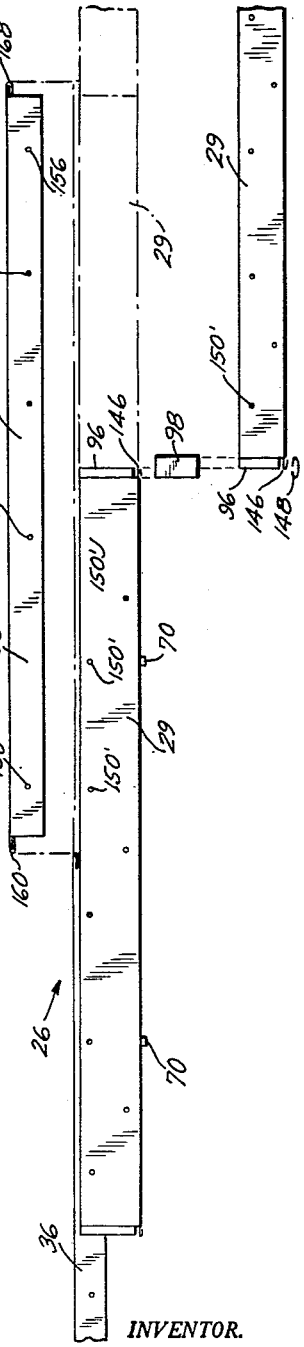
INVENTOR.
Roy F. Leonard
BY Emery, Whittemore,
Sandoe & Graham
ATTORNEYS United States Patent Office 3,120,303
Patented Feb. 4, 1964

3,120,303
MODULAR CONVEYOR
Roy F. Leonard, 79 Spring Valley Ave., Riveredge, N.J.
Filed Feb. 23, 1961, Ser. No. 91,010
14 Claims. (Cl. 198—204)

This invention relates to conveyors, and more especially to conveyors that are made in modular sections which permit changes in the length of a conveyor to accommodate it to different working conditions.

It is an object of the invention to provide an improved and simplified conveyor of the character indicated. Features of the invention relate to constructions for mounting a power-driving unit in interchangeable positions above or below a belt of the conveyor; to means for connecting modular sections of the conveyor together; to the maintenance of tension on the conveyor belt; and to the over-all construction of the frame of the apparatus.

The conveyor of this invention is suitable for use at the back of a series of work benches, with the conveyor resting on the bench tops or on brackets at a level above the bench tops.

Another object is to provide a conveyor construction having parts that are duplicates of other parts so as to reduce the inventory required for making up conveyors for particular operating conditions, and this similarity includes right and left-hand parts of identical construction.

Other objects, features and advantages of the invention will appear or be pointed out as the description proceeds.

In the drawing, forming a part hereof, in which like reference characters indicate corresponding parts in all the views;

FIGURE 1 is a small-scale, diagrammatic view, showing a conveyor made in accordance with this invention;

FIGURE 2 is an enlarged, top plan view, of the end of the conveyor having the power-driving unit;

FIGURE 3 is an end view of the conveyor structure shown in FIGURE 2;

FIGURE 4 is an enlarged sectional view, taken on the plane 4—4 of FIGURE 3;

FIGURES 5 and 6 are detail, sectional views taken on the planes 5—5 and 6—6, respectively, of FIGURE 4;

FIGURE 7 is an enlarged, fragmentary view, showing the motor-supporting bracket and its connection to the conveyor frame, the view being an enlarged view taken at the plane 7—7 of FIGURE 1;

FIGURE 8 is a view similar to FIGURE 7 but showing the position of the motor frame when the motor is in a lowered position, the view being an enlarged view taken at the plane 8—8 of FIGURE 1;

FIGURE 9 is a top plan view, similar to FIGURE 2, but showing the opposite end of the conveyor and with some parts broken away and separated for clearer illustration;

FIGURE 10 is an enlarged sectional view taken on the plane 10—10 of FIGURE 9;

FIGURE 11 is an enlarged sectional view showing the detached parts of FIGURE 9 when in assembled relation;

FIGURE 12 is a transverse sectional view through an intermediate portion of the conveyor but with the different elements spaced from one another for clearer illustration;

FIGURE 13 is a greatly enlarged top plan view of the belt-tensioning apparatus on one side of the conveyor;

FIGURE 14 is a sectional view taken on the plane 14—14 of FIGURE 13; and

FIGURE 15 is an exploded view showing the different modular sections of the conveyor frame.

FIGURE 1 shows a modular conveyor 20, constructed in modular sections. These sections include an end section 22 having belt-tensioning means; an opposite end section 24 having belt-driving means; and a plurality of intermediate sections 26, two of which are shown in FIGURE 1. It will be understood that additional intermediate sections 26 can be added, or sections subtracted from the conveyor, to change its length.

FIGURE 2 shows the driving mechanism of the end section 24. This section 24 includes a left-hand angular frame element 28 and a right-hand angular frame element 29. These elements are connected together near their lower ends by spacer bars 32.

The conveyor has a belt 34 which is endless and which travels around pulleys at opposite ends of the conveyor in a conventional manner. The portions of the conveyor sections, along which the belt 34 travels, have a cover 36 connected between the upper ends of the angular frame elements 28 and 29. These parts of the frame are shown in transverse section in FIGURE 12.

The upper run of the belt 34 rests upon the cover 36 and slides over the surface of the cover. The lower run of the belt 34 is supported at spaced locations by the spacer bars 32. It is not necessary for the lower run of the belt 34 to remain flat since there are no articles carried by the return run of the belt 34, and it is permissible to sag to some extent between successive spacer bars 32.

The left and right-hand angular frame elements 28 and 29 are attached to the cover 36 by fastening means, and preferably by self-tapping screws 38 having washers 39 between the screw heads and the angular frame elements 28 and 29. The spacer bars are preferably provided with inside threads for receiving screws 42 that connect the angular frame elements 28 and 29 to opposite ends of the spacer bars 32, and with washers 39 between the heads of the screws 42 and the outside faces of the angular frame elements 28 and 29.

Referring again to FIGURE 2, the belt 34 passes around a pulley 46 having an axle 48 that rotates in bearings 50. This axis 48 is driven by a motor 52 connected to a housing of a speed-reducer 54. This speed-reducer 54 is secured to a bracket 56. The motor 52 and the speed-reducer 54 are rigidly connected together and provide a driving unit 58, any part of which may be supported from the bracket 56. In the illustrated construction, the bracket supports the speed-reducer.

The speed-reducer 54 has a driven shaft 60 with a sprocket 62 secured to the shaft 60. This sprocket 62 drives a chain 64 which passes around another sprocket 66 on the axle 48 of the driving pulley 46. The sprockets 62 and 66, and the chain 64, are protected by a chain guard or housing 68.

FIGURE 3 shows the bracket 56 extending upwardly from the frame of the conveyor. The conveyor frame has feet 70, preferably made of rubber, for resting on a top surface 72 of a work bench or other support. The feet 70 extend slightly below the chain guard 68. These feet are secured to the inwardly extending portions of the frame elements 28 and 29, as shown in FIGURE 12. Self-tapping screws 38 connect the feet to the frame elements, and the heads of these screws are in counterbores in the lower ends of the feet.

When the conveyor is to be located at the front of a work bench, or at any other location where it is objectionable to have the bracket 56 and driving unit 58 extending across the top of the conveyor belt, provision is made for locating the driving unit 58 under the conveyor, as shown in broken lines in FIGURE 3. When so located, the bracket 56 is turned upside down so as to extend downwardly, instead of upwardly, from the conveyor frame; and the driving unit 58 is located inside the bracket instead of above and outside of the bracket, as in the full-line position shown in FIGURE 3. With the bracket 56 and driving unit 58 located below the conveyor belt, the conveyor can be used for carrying higher work pieces; and there are other circumstances which may make it desirable to have the space above the conveyor belt unobstructed.

FIGURES 4–6 show the construction for supporting the bearings 50 in which the pulley axle 48 turns. One of the bearings 50 is attached to a plate 76 that clamps against the outside face of the angular frame element 28. The plate 76 is held in this position by bolts 78. The other bearing 50 is attached to a plate 80 clamped against the outside face of the other angular frame element 29 by bolts 82.

The bolts 78 extend through slots 84 (FIGURE 5) in the angular frame element 28; and the bolts 82 extend through slots 86 in the angular frame element 29. In order to have the axle 48 adjustable so as to maintain it in a position which will prevent the conveyor belt from creeping one way or the other, the slots 84 are elongated in a direction at right angles to the elongation of the slots 86. This makes is possible to obtain a universal adjustment of the direction of extent of the axis of the axle 48 within the range necessary to obtain a parallel relation between the pulleys at opposite ends of the belt.

FIGURE 7 shows the actual construction for connecting the bracket 56 to the frame of the conveyor. This is not shown in FIGURE 3 because the scale is too small in that figure. The bracket 56 is connected with the upper part of the angular frame element 29 by screws 38 which may be the same screws as used for connecting the cover 36 to the angular frame element 29. The lower portion of the bracket 56 is secured to the frame element 29 by a bolt 88. One or more brackets 90 are attached to the bracket 56 by bolts 88; and these brackets 90 support the chain guard.

FIGURE 8 shows the way in which the bracket 56 is connected to the angular frame element 29 when the drive unit is to be located below the conveyor. In such a case, an angle connector 92 is attached to the angular frame element 29 by bolts 88, and this angle connector 92 extends downwardly below the frame element 28 and supports the bracket 56; the connector 92 being attached to the bracket 56 by other bolts 88. It will be understood that the bracket 56 is upside down in FIGURE 8, as compared to FIGURE 9, and the short end of the bracket 56 is attached to the horizontal portion of the frame element 29 below the spacer bar 32.

FIGURE 9 shows angular frame elements 28 and 29 of the intermediate section 26 of the conveyor. The sides of the angular frame elements 28 and 29 extend somewhat beyond the bottom portions of these frame elements and are folded back to form hooks 96.

The end section 22 of the conveyor has angular frame elements 28′ and 29′ which also have hooks 96. In connecting modular sections of the conveyor together, there are connectors 98 with hooks at both ends constructed to fit over the hooks 96 of the successive angular frame elements, the assembled relation being shown in FIGURE 11. The connectors 98 impart added strength to the conveyor frame and hold the successive sections in alignment with one another.

The end section 22 has a pulley 100 supported by an axle 102. The ends of the axle 102 extend into channel elements 104, there being one of these channel elements attached to each of the angular frame elements 28′ and 29′. These channel elements 104 may be attached to the frame elements 28′ and 29′ by any suitable fastening means, including welding, to form a unitary structure.

There are openings through the end portions of the axle 102 with bolts 106 extending through the openings. The bolts 106 prevent the axle 102 from rotating, but the axle is movable along the lengths of the bolts 106.

FIGURES 13 and 14 show the axle 102 and the means for sliding it along the length of one of the bolts 106. These means include a helical spring 110 compressed between a nut 112 and washers 114. The nut 112 is threaded on the bolt 106, but the washers 114 are free to slide on the bolt 106, and these washers bear against the axle 102. Rotation of the bolt 106 changes the position of the nut 112 and this changes the compression of the spring 110 with resulting increase or reduction of the force exerted by the spring against the axle 102. Thus the nut 112 provides means for adjusting the tension of the conveyor belt.

There are caps 116 and 118 at opposite ends of the channel element 104. The bolt 106 extends through openings in these caps 116 and 118.

Each of the caps 116 and 118 consists of two channel sections, including an outer section 121 which extends above the top and below the bottom of the channel element 104. The mid portion of the outer cap section 121 abuts against the end face of the channel element 104. In the construction illustrated, each cap 116 and 118 includes also an inner cap section 123 which fits within the channel element 104. These cap sections 121 and 123 are preferably secured together and they engage the end of the channel section 104 by straddling the top and bottom walls of the channel element.

The bolt 106 has a head 126 which clamps a washer 128 against the outside of the cap 118. At the other end of the bolt 106 there is a nut 130 clamping a washer 131 against the end cap 116. Thus the bolt 106 holds the end caps 116 and 118 in assembled relation with the channel 104.

When the nut 112 is to be adjusted, the head 126 of the bolt 106 is rotated in the direction necessary to move the nut 112 to increase or decrease the spring pressure, as desired.

FIGURE 15 is a diagrammatic, exploded view of the different portions of the conveyor frame, and illustrating the way in which the modular sections are connected together. The cover 36 is of the same modular length as the angular frame element 29; but these parts are staggered so that the connection between two successive frame elements 29 comes at a location midway between the ends of a cover 36. The frame elements 29 are spaced from one another vertically in FIGURE 15, for better illustration; but it will be understood that when connected together, the lower frame element 29 is moved up into the broken-line position shown in FIGURE 15, and the connector 98 is engaged over the hooks 96 of the successive frame elements 29. The portions of the frame elements 29 which extend horizontally, at the lower ends of these frame elements 29, are formed with hooks 146 corresponding to the hooks 96 and secured together by a similar connector 148.

The cover 36 has openings 150 which register with corresponding openings 150′ in the angular frame elements 29. Screws 38 (FIGURE 12) are used to connect the cover 36 to the angular frame elements 28 and 29 to make a rigid structure.

Referring again to FIGURE 15, the top surfaces of each of the covers 36 extends somewhat beyond the side surfaces of these covers and is folded under to form a smooth edge 160 for the top surface. Since the parts of the conveyor are made of sheet metal, a cut end would leave a sharp edge at the terminations of the covers 36 and this might abrade the conveyor belt unless burrs were carefully removed. The folded edge 160 makes it unnecessary to remove burrs from the cut edge of the cover and is more economical to manufacture than a cut edge from which all burrs have been removed.

The preferred embodiment of the invention has been illustrated and described, but changes and modifications can be made and some features can be used in different combinations without departing from the invention as defined in the claims.

What is claimed is:

1. A modular conveyor including a housing having a plurality of sections connected in end-to-end relation, an endless belt extending lengthwise of the conveyor, each of the housing sections including a top wall that extends across the full width of the conveyor belt and that supports an upper run of said conveyor belt, and including two side walls, fastening means connecting the side walls to the top wall, power driving means near one end of the housing, the section at the other end of the housing remote from the power driving means having the side walls slotted in the direction of the length of the housing and having channel sections secured to the side walls and covering said slots and with the open sides of the channels facing toward and in register with the slots, a pulley for the belt, an axle for the pulley extending through the slots and into the channels, and means within the channels urging the axle in a direction away from the power driving means to maintain a tension on the belt.

2. The modular conveyor described in claim 1 and in which the means within the channels include helical springs and lead screws operable to change the pressure of the springs against the axle.

3. A modular conveyor having a housing made up of sections and secured together in end-to-end relation, an endless belt, pulleys at opposite ends of the conveyor and around which the belt reverses its run, power driving means for the pulley at one end of the conveyor, and means for moving the other pulley at the other end of the conveyor in a direction to tension the belt, the tensioning means including resilient elements at both sides of said other pulley for equalizing the tension across the width of said other pulley, and means for adjusting the pulley at the power-driving end of the conveyor to obtain parallelism with the axis of said other pulley, said means for adjusting having guide surfaces limiting the adjustment to horizontal movement at one side of the conveyor and other guide surfaces limiting the adjustment to vertical movement on the other side of the conveyor being limited to vertical movement at one side of the conveyor and to horizontal movement at the other side of the conveyor.

4. A modular conveyor having a housing made up of sections secured together in end-to-end relation, an endless belt, pulleys at opposite ends of the conveyor and around which the belt reverses its run, power driving means for the pulley at one end of the conveyor, the power driving means including a motor, and motion-transmitting connections leading from the motor to the pulley, a bracket that supports the motor, means for connecting the bracket to the housing in either of two reverse positions, the bracket being shaped to locate the motor above the level of the belt when the bracket is in an upward position, and to locate the motor at a level below the belt when the bracket is connected with the housing in a downward position, the bracket and the motion-transmitting connections being correlated so that the motion-transmitting connections reach the pulley without change of length when the motor is supported by the bracket in either of said reverse positions.

5. The modular conveyor described in claim 4 and in which the bracket is attached to the housing by detachable fastening means, and the bracket is turned upside down to change it from its first to its second position.

6. A modular conveyor including a housing made up of sections connected together in end-to-end relation, each section including a top wall that supports the conveyor belt, and side walls at opposite sides of the section, the top wall and the side walls being of substantially the same length but the ends of the top wall being in a different position lengthwise of the conveyor from the ends of the side walls so that in the assembled housing the connections between successive lengths of the top wall are in staggered relation with the connections between the successive lengths of the side walls, the top wall and side walls being made of sheet metal and having the active length of their end edges folded over where the successive sections of the housing come together.

7. The modular conveyor described in claim 6 and in which the contiguous edges of different sections of the side walls are folded back on their outsides, and there are connectors, each of which is folded over along its opposite edges and that hooks into the contiguous folded end edges of a side wall along their entire length to secure those edges of the side wall to one another.

8. The modular conveyor described in claim 6 and in which the contiguous edges of different sections of the top wall are folded under to remove the sheet metal edges at the ends of the top sections from contact with the belt that is supported by the top wall of the housing.

9. A modular conveyor including a housing having a plurality of sections connected in end-to-end relation, an endless belt extending lengthwise of the conveyor, each of the housing sections including a top wall that extends across the full width of the endless belt and that supports an upper run of the conveyor belt, and including two side walls extending downward for a substantial distance below the top wall and that are of identical construction, each of the side walls being an angle section and having an upwardly-extending leg and a lower leg that extends substantially at right angles to the upwardly-extending leg at the lower end thereof, the side walls being oriented in opposite directions so that their lower legs extend toward one another to form a partial bottom for the housing, the different walls and sections having openings therein that align with one another when the parts of the housing are in their intended relation wtih one another, and fastening means that fit into the various aligned holes to secure the parts of the conveyor in assembled relation with one another.

10. The modular conveyor described in claim 9 and in which the lower legs extending inwardly from the side walls each extend less than one half way across the width of the housing so that there is an opening between the inwardly-extending legs of the side walls, and there are bars extending across the opening above the inwardly extending legs at spaced locations along the length of the housing for supporting a lower run of the conveyor belt.

11. The modular conveyor described in claim 9 and in which the side walls are held in spaced relation at their upper ends by connection with the top wall of the housing, and the side walls are held in spaced relation at their lower ends by spacer bars extending from one side wall to the other at longitudinally-spaced locations along the length of the housing, and fastening means connecting the side walls to the spacer bars, the spacer bars being located under a bottom run of the belt and providing supports therefore.

12. A modular conveyor including a housing having a plurality of sections connected in end-to-end relation, an endless belt extending lengthwise of the conveyor, each of the housing sections including a top wall that extends across the full width of the conveyor belt and that supports an upper run of said conveyor belt, and including two side walls, fastening means connecting the side walls to the top wall, power driving means near one end of the housing, the section at the other end of the housing remote from the power driving means having the side walls slotted in the direction of the length of the housing and having channel sections secured to the side walls with the open sides of the channels in register with the slots, a pulley for the belt, an axle for the pulley extending through the slots and into the channels, and means within the channels urging the axle in a direction away from the power driving means to maintain a tension on the belt, and in which there are caps at both ends of each of the channels, a lead screw extending lengthwise of each channel from one cap to the other, the lead screw being of substantially smaller diameter than the pulley axle and extending through an opening in the pulley axle, a collar on each of the lead screws, a washer slideable along each of the lead screws, the spring in each of the channels being in the form of a helix surrounding a portion of the lead screw between the collar and the washer and being compressed between said collar and washer.

13. The modular conveyor described in claim 12 and in which the collar is threaded on the lead screw and is movable toward and from the axle by rotating the lead screw in one direction or the other to change the pressure of the spring against the washer and the axle.

14. The modular conveyor described in claim 13 and in which the channels have flanges that confront the outside surfaces of the side walls and that are welded thereto, and the caps at the ends of the channels have edge portions that engage both inside and outside of the sides of the channels to secure the caps against transverse displacement with respect to the channels.

References Cited in the file of this patent

UNITED STATES PATENTS

| | | |
|---|---|---|
| 815,470 | Read | Mar. 20, 1906 |
| 2,308,872 | Foster | Jan. 19, 1943 |
| 2,523,829 | Hubbell | Sept. 26, 1950 |
| 2,551,147 | Mayrath | May 1, 1951 |
| 2,644,570 | Russell | July 7, 1953 |
| 2,667,988 | Bax | Feb. 2, 1954 |
| 2,677,456 | McCann | May 4, 1954 |
| 2,747,725 | Hatch et al. | May 29, 1956 |